United States Patent
Michalski et al.

(10) Patent No.: US 7,733,788 B1
(45) Date of Patent: Jun. 8, 2010

(54) COMPUTER NETWORK CONTROL PLANE TAMPERING MONITOR

(75) Inventors: John T. Michalski, Albuquerque, NM (US); Thomas D. Tarman, Edgewood, NM (US); Stephen P. Black, Littleton, CO (US); Mark D. Torgerson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1465 days.

(21) Appl. No.: 11/053,737

(22) Filed: Feb. 8, 2005

Related U.S. Application Data

(60) Provisional application No. 60/605,644, filed on Aug. 30, 2004.

(51) Int. Cl.
*G01R 31/08* (2006.01)
(52) U.S. Cl. ........................ 370/242; 709/224
(58) Field of Classification Search ........................ None
See application file for complete search history.

(56) References Cited

U.S. PATENT DOCUMENTS

| | | | |
|---|---|---|---|
| 6,026,442 A | 2/2000 | Lewis et al. | |
| 6,041,037 A * | 3/2000 | Nishio et al. | 370/228 |
| 6,205,488 B1 | 3/2001 | Casey et al. | |
| 6,363,053 B1 | 3/2002 | Schuster et al. | |
| 6,374,303 B1 | 4/2002 | Armitage et al. | |
| 6,628,624 B1 * | 9/2003 | Mahajan et al. | 370/256 |
| 6,748,431 B1 | 6/2004 | Fleig et al. | |
| 6,751,196 B1 | 6/2004 | Hulyalkar et al. | |
| 6,765,921 B1 | 7/2004 | Stacey et al. | |
| 6,839,353 B1 * | 1/2005 | DeJager | 370/395.21 |
| 6,898,641 B1 * | 5/2005 | Kobayashi | 709/238 |
| 7,111,052 B1 * | 9/2006 | Cook | 709/219 |
| 7,283,563 B1 * | 10/2007 | Allan | 370/469 |
| 7,295,577 B2 * | 11/2007 | Moody et al. | 370/496 |
| 7,325,140 B2 * | 1/2008 | Carley | 713/182 |
| 2003/0023716 A1 * | 1/2003 | Loyd | 709/224 |
| 2003/0156541 A1 * | 8/2003 | Haihong | 370/235 |
| 2004/0258226 A1 * | 12/2004 | Host | 379/106.01 |
| 2005/0249123 A1 * | 11/2005 | Finn | 370/242 |
| 2006/0039371 A1 * | 2/2006 | Castro et al. | 370/389 |
| 2007/0121596 A1 * | 5/2007 | Kurapati et al. | 370/356 |
| 2007/0294759 A1 * | 12/2007 | Browne | 726/14 |

OTHER PUBLICATIONS

Malimi et al, "Overview on MPLS Virtual Private Networks" Photonic Network Communications, Kluwer Academic Publishers, 2002, vol. 4. No. 2. pp. 115-131.

Laurent Mathy et al, "The Internet: A Global Telecommunications Solution?", IEEE Network, Jul./Aug. 2000, pp. 46-57.

Thomas D. Tarman et al, "Final Report for the Multiprotocol Label Switching (MPLS) Control Plane Security LDRD Project", SAND2003-3457, Sep. 2003.

* cited by examiner

*Primary Examiner*—Phirin Sam
(74) *Attorney, Agent, or Firm*—Carol I Ashby

(57) ABSTRACT

A computer network control plane tampering monitor that detects unauthorized alteration of a label-switched path setup for an information packet intended for transmission through a computer network.

17 Claims, 2 Drawing Sheets

COMPUTER NETWORK CONTROL PLANE TAMPERING MONITOR

This patent application claims priority benefit from U.S. provisional patent application Ser. No. 60/605,644, filed on Aug. 30, 2004, which is incorporated herein by reference.

The United States Government has rights in this invention pursuant to Department of Energy Contract No. DE-AC04-94AL85000 with Sandia Corporation.

BACKGROUND OF THE INVENTION

This invention relates to a method for monitoring the establishment of a label-switched path (LSP) through a global domain of label-switched nodes, such as, for example label-switched routers (LSRs). It provides for the detection of adversarial or accidental alterations of the label-switched path during its set-up.

As rapid Internet growth continues, global communications becomes more dependent on Internet availability for information transfer. Recently, the Internet Engineering Task Force (IETF) introduced a new protocol, Multiple Protocol Label Switching (MPLS), to provide high-performance data flows within the Internet. MPLS emulates two major aspects of the Asynchronous Transfer Mode (ATM) technology. First, each initial IP packet is "routed" to its destination based on previously known delay and congestion avoidance mechanisms. This allows for effective distribution of network resources and reduces the probability of congestion. Second, after route selection each subsequent packet is assigned a label at each hop, which determines the output port for the packet to reach its final destination. These labels guide the forwarding of each packet at routing nodes more efficiently and with more control than traditional IP forwarding (based on complete address information in each packet) for high-performance data flows.

Label assignment is critical in the prompt and accurate delivery of user data. However, the protocols for label distribution were not adequately secured. Thus, if an adversary compromises a node by intercepting and modifying, or more simply injecting false labels into the packet-forwarding engine, the propagation of improperly labeled data flows could create instability in the entire network. In addition, some Virtual Private Network (VPN) solutions take advantage of this "virtual channel" configuration to eliminate the need for user data encryption to provide privacy. VPN's relying on MPLS require accurate label assignment to maintain user data protection.

A number of patents exist concerning MPLS networks. They do not address the need for monitoring the establishment of a label-switched path (LSP) through a global domain of label switched routers (LSRs) to allow the detection of adversarial or accidental alterations of the label-switched path during its set-up.

Casey et al. (U.S. Pat. No. 6,205,488) reports a virtual private network that enables private communications between two or more private networks over a shared MPLS network. The virtual private network disclosed includes multiple routers connected to the shared MPLS network and configured to dynamically distribute VPN information across the shared MPLS network. The VPN information distributed by a router includes a VPN identifier assigned to that router, which identifies a VPN with which that router is associated. The router includes a first table which stores a map of the label switched paths from the router in question to all other routers connected to the shared MPLS network. The router also includes a second table which stores a map of label switched paths from the router in question to all other routers connected to the shared MPLS network which share a common VPN identifier.

Schuster et al. (U.S. Pat. No. 6,363,053) reports a method and apparatus for measurement-based conformance testing of service level agreements in networks. The method includes first collecting quality of service information from network traffic over a plurality of network nodes. Then, the collected quality of service information is compared to a plurality of specified quality of service levels. A plurality of possible virtual quality of service pathways through a plurality of network nodes is provided, based on the compared quality of service information. One embodiment of the method includes the additional step of creating a virtual connection using the compared quality of service information. In another embodiment of the method, the step of collecting quality of service information from network traffic over a plurality of network nodes includes first transmitting test traffic from a source to a destination over a plurality of network nodes. The transmitted test traffic is then received at the destination, and quality of service information is identified by comparing characteristics of the test traffic transmitted by the source to characteristics of the test traffic received by the destination.

Armitage et al. (U.S. Pat. No. 6,374,303) reports an arrangement of label augmented, multi-protocol routing of data packets in a network utilizing fixed length labels that are negotiated between adjacent label routing routers in the network. Portions of each routing label may be assigned by both upstream and downstream routers in the network. Routing labels are used in lieu of conventional address headers to route data packets through said network; and by using routing labels the routers have more flexibility in routing data packets through said network and can use network links between routers that normally carry less traffic.

Stacey et al. (U.S. Pat. No. 6,765,921) reports a communications multi-service network arrangement for transporting information packets from a user station to a destination that comprises a label switched core network constituted by a plurality of abstract nodes interconnected by tunnels. Each abstract node comprises one or more real nodes. An access network provides user access to the core network. A route across the core network comprises a plurality of label switched path sections specified in terms of a sequence of abstract nodes, the route being identified by a label stack identifying a quality of service capable connection from the end station via the access network to the core network and across the core network to a destination.

Fleig et al. (U.S. Pat. No. 6,748,431) reports systems and methods for monitoring exchanges between a client and a server across a network. Implementation of the Fleig et al. invention takes place in association with a client and server that use standard Internet protocol to exchange requests and responses over a network. An extendable network monitor is employed to obtain a network monitor trace. Entire requests and responses are rebuilt. Chunked information is coalesced. Interleaved packets are collected. Bodies of data written in extensible markup language are reformatted by including white space and highlighting important data. Bodies of data written in hyper-text markup language are optionally removed from the requests and responses. As such, and in accordance with the present invention, the requests and responses exchanged by a client and a server across a network are made easily readable to a user, thereby allowing the user to read, interpret, and analyze the exchanges to ensure that the exchanges occurred correctly and as expected.

Hulyakar et al. (U.S. Pat. No. 6,751,196) reports a method and apparatus for assessing the quality of the communication paths among all stations in a network. This assessment is useful as a continual monitor of the quality of the network, and can be utilized to select an alternative central control station based upon the quality of communication paths to and from this station. Additionally, the quality assessment can be utilized to establish relay communication paths, as required.

The following is not an MPLS-based patent.

Lewis et al. (U.S. Pat. No. 6,026,442) reports how control of network surveillance in communications networks is accomplished by dividing the surveillance task into two sub-tasks. The first sub-task automatically identifies communications within the network which are to be monitored. Such identification is accomplished by the application of a reasoning system to data received from the network. The identification of the data to be monitored is received by the second sub-task along with network topology information. The second sub-task also applies a reasoning system to this data in order to configure probes and switches within the network so that the identified data can be captured.

The preceding do not enable a network administrator to detect and identify the location of an adversary who is tampering with the passage of data through a network in an attempt to degrade network performance or to obtain user data in an unauthorized manner. There is a pressing need for a tamper-detection method such as that implemented by this invention due to the range of adversarial threats to proper transfer of information through a network. The following is a list of some possible adversarial threats that are addressed by the tamper-detection method of this invention.

The network under consideration is owned and controlled by a single entity. The ingress and egress nodes are the nodes that are in physical communication with nodes in another network. The transit nodes can only communicate with other nodes within the network.

The adversary may have three goals for the manipulation of signaling messages.
  a) The adversary wishes to obtain network messages because the data content has value to the adversary.
  b) The adversary wishes to do traffic analysis.
  c) The adversary wishes to degrade the capability of the network, for example, by harming the overall throughput.

Typically, the control channel is secured through some sort of link-by-link security feature. It is generally impractical to implement a link-by-link encryption scheme within a network domain. Such implementation entails providing a crypto key management function for every potential link traversed by a control message. This would increase unacceptably the complexity and processing overhead of each participating network node. An adversary may view and/or delete any control message, but any altered message will be discarded. As such, the adversary may sever physically or logically any control link that appears in the network that he can gain access to. Further manipulation of the control messages by an adversary requires compromise one or more nodes. However, that if one only monitors the two end nodes, it may not be possible to tell if a disruption is generated at one end of a series of linked nodes, in the middle of the link, or the other end of the linked nodes.

A particular compromised node may not have the resources to process the desired data. It may need to forward the data to another compromised node or some other node outside the network so that it can be saved and/or processed there. This can be accomplished by forwarding a label switch path request toward a more accessible location within the network. This can be accomplished by changing the hop-by-hop assignment in the explicit route table within the LSP message unit, redirecting a flow through a compromised node or link that is accessible for monitoring. Such rerouting can also be accomplished by a compromised node forwarding the LSP unit request through a port that may be less desirable as a legitimate route selection, but which allows the flow to traverse part of the network that is less secure and more amenable to unauthorized monitoring.

As long as control-plane data remains unprotected, there may be an adversary motivated to manipulate the control-plane data in order to acquire user data. Any such manipulations are likely to degrade the overall throughput of the network, which in turn affects the bottom line of the network. It may seem that a good way to remove the temptation for an adversary to acquire user data would be to encrypt the control-plane data from ingress node to egress node. However, such encryption comes at a cost in overall network performance. This encryption must be administered link by link throughout the entire domain; an end-to-end VPN tunnel cannot be implemented because the control-plane data is changed as it is processed throughout its node-by-node traversed path from the ingress of the network to the egress. A network must weigh that cost against the expected degradation in performance associated with reroutes because an adversary desires data content.

An adversary that desires to harm the network by degrading its performance has many options. These options include physical attacks on the equipment, user-plane attacks, and control plane attacks.

Because the intent of MPLS is to efficiently switch datagrams through the network, cryptographic security means generally will not be applied to the switching information in the packet headers due to the great reduction in efficiency that would result. This means that an adversary with access to the control-plane channel would be able to modify the switching information to send packets down unauthorized LSPs. The adversary may modify information deeper in the packet that only the egress node would be able to detect, or information that only the end user would be able to detect. In any of these cases, the corrupt information may pass through the network before its corruption is detected. This corruption may initiate a resending of the information, thereby degrading the network's overall performance. The effects of such attacks are felt throughout the network as corrupt packets are forwarded through the network.

Since the switched packets are not authenticated en route, the adversary with channel access may generate locally valid looking packets to the full capacity of the channel. The falsely generated packets may progress through the network in a number of ways.

The preceding methods of network disruption have not required compromising a node. Furthermore, the denial-of-service (DoS) mechanisms described above are independent of the security features applied at the control-plane. For such types of attacks, a secure control plane will not be able to prevent all denial or degradation of service attacks. Therefore, it is especially important to understand the impacts on overall network performance that may result from the application of a particular security method to the control-plane.

If a node is compromised, the adversary will have the ability to accomplish any of the DoS attacks describe thus far, but he will also have additional abilities. If an ingress node is compromised, it may generate traffic of any sort. It may flood the control plane of the entire network with bogus messages. It may reserve very high bandwidth, very high priority, and very explicit circuitous routes. On the more subtle side, a compromised ingress node may just bump up the bandwidth reservation requirements of all valid flows by a certain percentage. It may choose the worst paths that are still within-tolerance paths. One compromised ingress node may completely shut down the entire network. Network degradation due to a compromised ingress node is generally independent of any additional control-plane security methods that may be applied. Ingress nodes should be independently hardened to the highest level to protect the network.

Compromised transit nodes within the network may cause serious problems. If the route set-up messages are not globally authenticated, a transit node may mimic an ingress node and generate very high bandwidth, very high priority, and very explicit circuitous routes. This will have as serious an effect on the network as when an ingress node generates the false requests. However, a control-plane security method such as use of the control plane tamper detection method of this invention can be applied to detect and stop this behavior.

SUMMARY OF THE INVENTION

This invention comprises a control-plane monitor (CPM) that provides a method of monitoring the establishment of a path through a global computer network to determine whether a proper path is being established. A proper path is one that is consistent with network protocols and that has not been tampered with by an adversary.

The CPM performs tamper detection for an entire global domain of Label Switch Routers and other types of nodes while eliminating the need to implement costly link-by-link encryption. The CPM comprises a control-plane message unit comparator. It provides efficient real-time monitoring capability with a single monitoring platform for processing economy. It also eliminates the need for reliance on secure physical protection mechanisms located on individual Label Switch Router platforms.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a control-plane monitor (CPM) that provides a method of monitoring the establishment of a path through a global network to determine whether a proper path is being established. A proper path is one that is consistent with network protocols and that has not been tampered with by an adversary.

An embodiment of this invention is an RSVP-TE control-plane monitor architecture that provides a method of monitoring Multi-protocol Label Switching (MPLS) control events for proper operation in a potentially adversarial environment. Additional embodiments can be implemented using other dynamic signaling protocols. Examples include but are not limited to SS7 (telecommunications), UNI/PNNI (ATM), and GMPLS/LMP (optical core networks). Resource Reservation Protocol with Traffic Engineering (RSVP-TE) is an extension to RSVP, which is one standard dynamic signaling protocol. It allows labels to be assigned to flows of information that are being directed through a network based on network-management-assigned metrics. The CPM adds a security extension to the RSVE-TE implementation that monitors RSVP-TE setup and other control messages for consistency with authorized operations. The monitoring occurs at a central monitor which reviews the setup and control messages sent between label-switched nodes. One example, among others, of a label-switched node is a Label Switch Router (LSR). The following discussion of the invention will, in general, refer to LSRs, but the invention is also applicable to other label-switched nodes, such as, for example, a router device, a Layer 3 Ethernet device, a Layer 3 GigEthernet device, an ATM (Asynchronous Transfer Mode) device, a SONET (Synchronous Optical NETwork) device, a Frame Relay Device, and other label-switched intelligent devices.

The monitor can detect Label Switch Path (LSP) setup events that are contrary to established domain policy, for example, unauthorized tear-down messages, unauthorized modifications to quality-of-service (QoS) parameters, unauthorized class-of-service (CoS) requests, and unauthorized traffic-engineered routes. It can also detect collusion between two or more label-switched nodes. The reporting paths between the LSRs and a central monitor are typically although not necessarily protected with a standard IPSec tunnel configuration in typical networks; the CPM architecture eliminates the need to implement link-by-link encryption mechanisms on each individual LSR platform within a network. The CPM architecture can be implemented within an Internet Service Provider (ISP) network or any Enterprise network utilizing a dynamic signaling protocol, such as, for one example among others, the RSVP-TE protocol.

Figure 1:
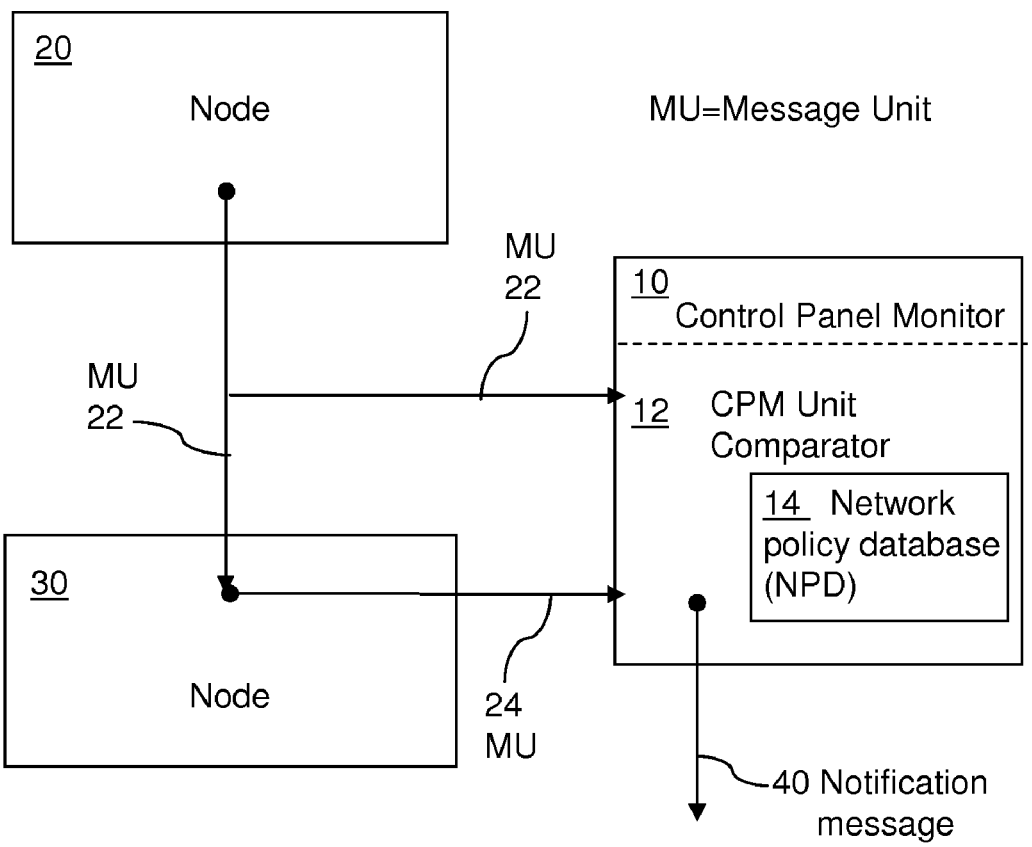
FIG. 1 illustrates an embodiment of the Computer Network Control Plane Tampering Monitor.
Figure 1:
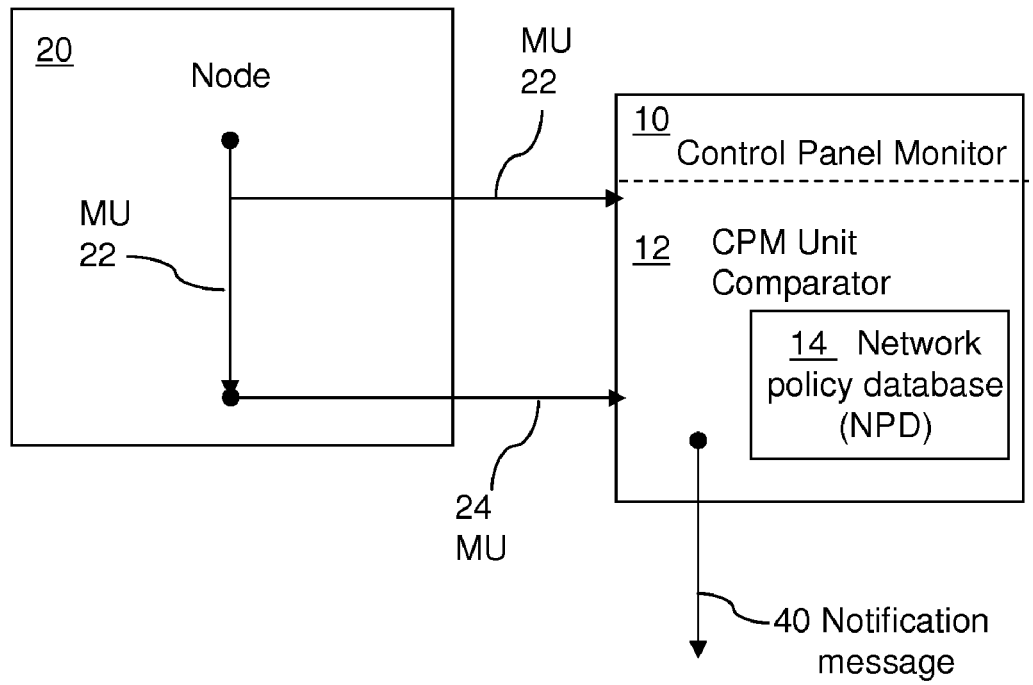

The CPM performs Label Switch Path tamper detection for an entire global domain of Label Switch Routers and other types of nodes while eliminating the need to implement costly link-by-link encryption. The CPM 10 comprises a control-plane message unit comparator 12 (FIG. 1). It provides efficient real-time monitoring capability with a single monitoring platform for processing economy. It also eliminates the need for reliance on secure physical protection mechanisms located on individual Label Switch Router platforms.

The CPM 10 can detect tampering with a control-plan message through the comparison of selected segments (fields or objects) of a message unit as it is received, processed, and transmitted between nodes 20 and 30 within a network, as shown in FIG. 1(a), or within a single node 20 within a computer network, as shown in FIG. 1(b). The CPM can monitor a wide variety of control-plane messages, as will be clear to one skilled in the art. To illustrate the operation of this invention, we describe explicitly here the application of the CPM to three important types of messages in the RSVP-TE implementation of MPLS: path, reservation, and tear-down. The application to other types of control-plane messages is also possible. Application of this invention can also be used to detect network policy violations during LSP set-up or construction of an MPLS tunnel through which MPLS-labeled packets will be forwarded.

When a node 20 generates and sends a message unit 22 along the LSP that is being established, the message unit 22 is also sent to the comparator 12. When the message unit 22 is received, a second message unit 24 is sent to the comparator for comparison with the first message unit 22 to determine whether an expected pair of values from one or more information fields in the message unit is obtained. The location of the reception of message unit 22 can be within the same node 20 where it was generated or in another node 30. Detection of unexpected pairs suggests that tampering may have occurred and triggers notification of the system administrator by one of several possible means discussed later.

Upon receipt of an incoming path message unit in an RSVP-TE-based embodiment of this invention, the LSP ID field of the path message unit is examined by the control-plane message unit comparator to determine whether a table has been allocated to the LSP to store the received path message unit. If not, a table is created and the incoming path message unit is stored. If a table has already been allocated to the LSP that is being established, the control plane message unit comparator compares the current received path message unit with a previously received path message unit to determine whether an expected pair of values for one or more information fields is obtained. The following are among the various information fields, also referred to as objects, of a path message unit that can be used for comparision and thus tamper detection:

Label Request Object
Explicit Route Object
Record Route Object
Sender Template Object
Session Attribute Object
Filter Spec Object
Flow Spec Object
Class of Service Object If any of the comparisons of path message unit fields result in tamper detection, the Control Plane Message Unit Comparator can provide a notification message 40 to the system administrator. Fields within the message unit that are processed by the local LSR can be compared based on previous knowledge of the content of the fields or objects of an incoming path request when the local LSR sends its copy of its processed message unit to the CPM prior to forwarding it to the next-hop LSR. This comparison can be done based on information from upstream LSR's or by an established policy. Two among many possible methods of notification are logging to a file and displaying on a monitor. Other methods include but are not restricted to visual notification and audio notification.

Upon receipt of an incoming reservation message unit in an RSVP-TE-based embodiment of the invention, the LSP ID field of the reservation message unit is examined by the control plane message unit comparator 12 to determine if a table has been allocated to the LSP to store the received reservation message unit. If not, a table is created and the incoming reservation message unit is stored. If a table has already been allocated to the LSP, the control-plane message unit comparator compares the current received reservation message unit with a previously received reservation message unit to determine whether an expected pair of values for one or more information fields is obtained. The following are among the various fields, also referred to as objects, of a reservation message unit that can be used for examination and thus for tamper detection:

Label Object
Record Route Object
Session Object
Style Object

If any of the comparisons of reservation message unit fields result in tamper detection, the Control-Plane Message Comparator can provide a notification message 40 to the system administrator. Fields within the message unit that are processed by the local LSR can also be compared based on previous knowledge of the contents of the fields or objects of an incoming request when the local LSR sends its copy of its processed message to the CPM prior to forwarding to the next hop LSR. This comparison can be done based on information from upstream LSR's or by an established policy. Two among many possible methods of notification are logging to a file and displaying on a monitor. Other methods include but are not restricted to visual notification and audio notification.

Another approach to tampering with the proper operation of a network is the injection of incorrect tear-down messages for label-switched paths. The Control-Plane Message Comparator 12 can provide notification 40 to the system administrator of an improper tear-down message. Two among many possible methods of notification are logging to a file and displaying on a monitor. There are two general types of tear-down messages.

The path tear-down message is used to delete a matching path state. Path tear-down messages are initiate by senders (any node upstream of the original LSP path request) or by the expiration of the path state timer. Path tear-down messages travel downstream towards the egress node. The routing of a path tear-down message is identical to the corresponding path message.

Upon receipt of an incoming path tear-down message unit, the Path Session ID field, and the Sender Template information field of the message unit can be examined to determine whether it has been initiated by an appropriate LSR node or it is the result of tampering.

The reservation tear-down message is used to delete a matching reservation state message. If there is no matching reservation state, the tear-down message is ignored. Reservation tear-down messages are initiated by receivers (any node downstream of the original LSR reservation request) or by a node which had a reservation state time out. Reservation tear-down messages travel upstream toward the ingress node through all matching senders (upstream nodes participating in the LSP).

Upon receipt of an incoming reservation tear-down message unit, the Resv Session ID field and the next-hop (NHOP) object field of the message unit can be examined to determine whether it has been initiated by an appropriate LSR node or is the result of tampering.

The CPM allows detection of MPLS label switched routers (LSRs) that have been compromised. A compromised LSR can be used to do the following:

a) Establish unauthorized label switched paths (LSPs). An LSP that advertises connectivity to an IP subnet can be re-routed in manner that allows examination of traffic.
b) Modify explicit routing information or LSP/label mappings. Not only does this facilitate re-routing, but it also corrupts correct routing of LSPs, resulting in denial of service.

The CPM is not intended to provide active protection of the inter-LSR control plane channels but rather to provide tamper detection, as the protection of the inter-LSR control plane is provided by conventional IPSec mechanisms. However, even with standard IPSec mechanisms in place on the control-plane connections, compromise of LSR's is still possible, for example, by unauthorized management access using inadequately protected passwords. In addition, erroneous LSR operation may occur if the LSR has been inserted correctly, but configured incorrectly.

The CPM provides monitoring of LSP creation and deletion events within a routing domain using a routing protocol, for example, within the border gateway protocol (BGP). Monitoring within the routing domain is termed global monitoring. With global monitoring, the following can be detected.

a) LSP establishment that is contrary to domain policy. If an LSR or other node is compromised and attempts to establish LSPs in an unauthorized manner, the neighboring LSRs will report LSP establishment events to a global LSP monitor (the CPM). The monitor can compare these events against a network policy database 14 such as, for example, a LSP policy database or a routing topology database to determine if the LSP is unauthorized.

b) Label advertisements that are contrary to domain policy and/or current network state. When an LSR receives a label advertisement, it can notify the global LSP monitor. The monitor can compare these advertisements against a network policy database 14 such as, for example, a LSP policy database or a routing topology database to determine deviations.

c) Collusion between two or more LSRs (and identify which LSPs are involved). This approach relies on the correlation of events from uncompromised routers to determine whether an intrusion has occurred. If two or more LSRs are colluding, they can report false events to the monitor in an attempt to mask the unauthorized behavior. The monitor can compare LSP and label distribution protocol (LDP) events to determine whether unauthorized activity is occurring, and which LSRs are involved.

d) Unauthorized LSP tear-down request. The CPM can detect and track the path and reservation tear-down messages as they propagate through the network.

e) Unauthorized quality of service requests that are contrary to the appropriate Forward Equivalency Class (FEC) mappings assigned at the ingress node of the network. The CPM can detect tampering with the assigned QoS attributes of an LSP.

f) Traffic engineered routes that are unauthorized or have been modified from their initial path. The CPM can detect deviations from the proper route and explicit record route object modifications.

Figure 2:
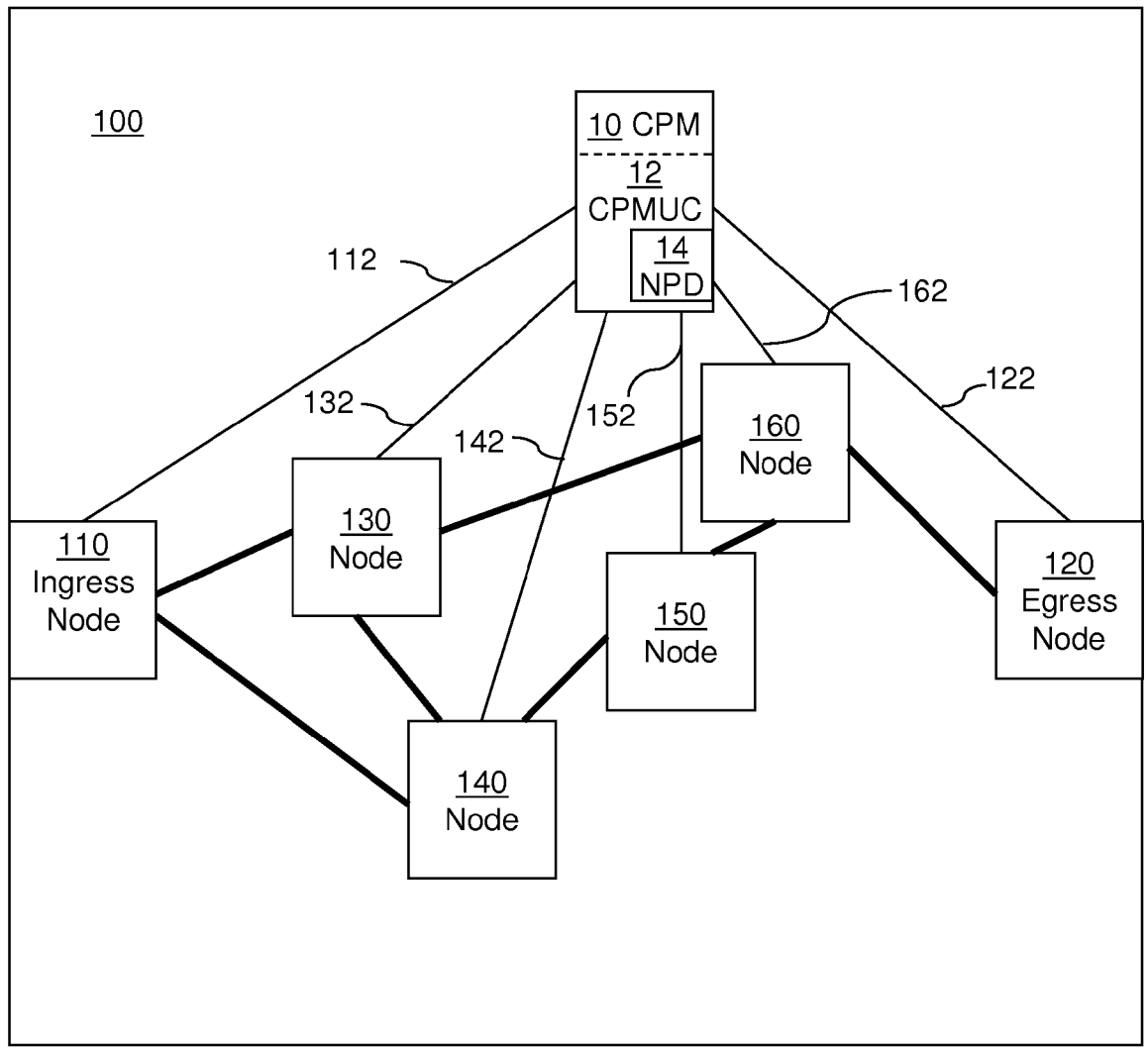
FIG. 2 illustrates a network architecture for implementation of the Computer Network Control Plane Tampering Monitor.

One embodiment of an implementation of the architecture of the CPM is illustrated in FIG. 2 for a network consisting of an ingress node 110, an egress node 120, and four additional nodes (130, 140, 150, and 160) within the network. In this architecture, the control and CPM message channel that link each of the nodes are secured using IPSec, in accordance with standard network security policies. Each node within the network (130, 140, 150, and 160) and each label edge router (LER) (110 and 120) is configured with the address of the CPM 10 and Control-Plane Message Unit Comparator (CPMUC) 12 within the CPM and sends path notifications to the CPMUC over an IPSec-protected channel (112, 122, 132, 142, 152, and 162). Upon arrival of the path notifications, the monitor can examine a network policy database 14 to determine whether the incoming path notifications are consistent with the policies of the network. More than one database may be included in the comparison. Two examples among others of such databases are a path setup policy database and a network topology policy database. Traffic engineering may sometimes require that a path be set up in a manner that is not consistent with the current network topology. In such cases, comparison with the network topology database would not be used to determine whether a notification should be generated.

The Control-Plane Monitor can be used to detect policy violations with LSP setup associated with individual Label Edge Routers (LERs). Label Edge Routers that are Ingress routers are responsible for initiating an LSP request and thus are responsible for the related attributes associated with each LSP. Operational profiles can be assigned to each LER or group of LERs that restrict or dictate acceptable boundaries associated with LSP construction. Some examples of policy based violation detection include:

a) Disallowed or restricted routes: The CPM can review the next-hop-router field or, in the case of explicit route requests, examine the explicit route table to determine if any nodes listed within the table are part of a restricted route. The CPM can then provide an appropriate notification when policy is violated.

b) Unauthorized Class of Service (CoS) requests: A policy can be implemented that dictates which LER's can originate the specific levels of CoS. The CPM can monitor attributes of the CoS field, such as, for example, the amount of bandwidth that can be requested, the inter-packet delay, time of day associations, LSP filter constructs, and other CoS factors. The CPM can then provide an appropriate notification when policy is violated.

c) Collusion detection: Collusion occurs when two or more LSRs are attempting to circumvent the desired intent of a LSP. This can take on multiple forms; examples include but are not restricted to changing an explicit route table to redirect the path of an LSP, and changing some of the Quality of Service (QoS) attributes associated with the LSP. In these cases the colluding LSRs would send false reports to the CPM about their activity, hiding the changes and reporting that the original intent of the LSP has been followed. This mechanism is eventually discovered because the CPM has a "global" domain view of the entire LSP setup process. It eventually receives a report from a non-colluding node, and by reviewing the LSP object fields, confirms that a policy has been violated. Unless the entire LSP path has been compromised, an inconsistent LSP setup report will reach the CPM which can then provide an appropriate notification.

The CPM uses the incoming message units to determine whether an LSP is authorized, and if not, it determines which LSR is compromised. If multiple LSRs are compromised and colluding, then the monitor detects which LSRs are involved.

The MPLS control-plane protocol is susceptible to exploitation by adversaries attempting to create Denial of Service (DOS) situations and unauthorized Quality of Service (QoS) gains. The Control-Plane Monitor (CPM) functions, which reside on ingress and egress nodes, which include Label Edge Routers (LERs), and transit nodes, which include all intermediate LSR nodes within the domain, and a monitor platform, which can be a stand-alone computer, can provide detection of compromise and signal the need for isolation of Label Switched Routers (LSRs) that have been compromised. A compromised LSR can be used to perform a variety of unauthorized activities including but not restricted to the following:

a) Establish unauthorized Label Switched Paths (LSP's). An LSP that advertises connectivity to an IP subnet can be re-routed in a manner that allows examination of traffic.

b) Modify explicit routing information or LSP/label mappings. Not only does this facilitate re-routing, but it also corrupts correct routing of LSP's, resulting in denial of service.

c) Modify quality of service attributes to either increase or decrease the authorized quality of service for a specified flow. This can also create a denial of service scenario by disallowing the establishment of a LSP due to an excessive service subscription request.

d) Tear down authorized Label Switch Paths by injecting unauthorized path and reservation tear-down messages.

The following is a description of an embodiment of this invention using an RSVP-TE protocol. The CPM has a reporting function that is installed on participating Label Switch Routers or other nodes. This reporting function sends a copy of the LSP setup request message (message unit 22) that is being transmitted through the network to the CPM in real time as part of the LSP setup procedure. In the RSVP-TE protocol, the LSP setup messages include two message types: 1) a PATH setup message that originates at the ingress node of a network, for example on a LER (the ingress node 110) and is transmitted through the network hop-by-hop, being processed by each appropriate linked node selected from 130, 140, 150, and 160 through which it passes, until it terminates at the egress node 120, for example at another LER; and 2) a RESV message, which is a response to a PATH message, that originates at the egress node 120 of the network, for example on an Label Edge Router (LER) and terminates at the originating ingress node 110. Nodes 130, 140, 150, and 160 can be LSRs. Messages sent to the CPM monitor platform 10 provide a real-time monitoring capability using monitoring software that resides on the monitor platform. The information fields selected from related message units are compared in the control-plane message unit comparator (CPMUC) 12. The monitor platform can provide LSP tamper detection for an entire domain 100 of nodes, such as, for example, LSP routers.

In some embodiments, such as, for example, in an RSVP-TE-based network, the implementation of this invention can be described as follows where the ingress and egress nodes are LERs and the transit or intermediate nodes are LSRs. FIG. 2 illustrates one possible configuration of a simple network of LERs, LSRs, and the CPM. As the LSP signaling process begins within the monitored network 100, a PATH message is sent from the Ingress router LER 110 to the Egress router LER 120. As the Ingress LER processes this message and sends it out to the next-hop router (130 or 140), it also sends this same message as part of a message unit to the CPM 10 through a protected IPsec or equivalent VPN tunnel 112. Each participating router establishes a VPN tunnel (122, 132, 142, 152, and 162) with the CPM 10. The VPN tunnels are a standard approach used to prevent manipulations of message traffic to the monitor. As the CPM 10 receives the message unit sent from the Ingress router 110, it identifies the originator of the message, the message type, a PATH or RESV message for example, and the LSP to which the message unit pertains. It then extracts the message unit object fields or information fields that will be used for comparison and temporarily stores these field values. As additional message units arrive from the series of next-hop label-switching routers (selected from among LERs 130, 140, 150, 160 and the egress router 120) in this simplified network illustration) reporting the set-up of the LSP, the CPMUC 12 compares each appropriate message pair and makes a real-time or near-real-time decision on the allowability of the values of the message unit object fields. When the CPM receives the last message unit for the LSP being monitored, it releases the resources that were used for processing the incoming message unit, thus allowing resources to be utilized by other incoming message units. A notification is provided when there is detection of unexpected or disallowed pairs of values in the information fields.

An example an embodiment of the invention follows that includes verification of compliance with network policies and comparison of pairs of values of information fields in sequentially generated messages passing from an ingress node through intermediate next-hop nodes to an egress node. The first message unit that is sent to the CPM is from the ingress node as it forwards the LSP set-up request downstream to the next-hop node or transit node. The next-hop node receives the message unit from the upstream node and forwards this message unit to the CPM. In the CPM, the information field or fields selected for tamper detection are compared and a notification is sent if the pair of values for a monitored information field is not an expected pair. A notification can also be send if a message unit contains information fields that deviate from established network policies as defined in the network policy database. Policy verification includes the comparing of attributes of the LSP request such as, for example, filter type and reroute options, setup and holding priorities, bandwidth allocation and minimum inter-packet delay request. These LSP attributes can be reviewed by a policy monitor that determines if appropriate limits associated with this ingress node have been followed. It processes the message unit by storing selected state information about the requested LSP. State information comprises the LSP ID to uniquely identify the request, a label request object for binding the path, explicit route info for next-hop-forwarding, record route information that stores traversed node addresses, session attributes which includes path setup priority, holding priority, reroute options and filter type, and filter specifications. It can also include a flow spec attrigute that defines a Class of Service (CoS) such as bandwidth allocation and inter-packet delay. This information is stored as state information on each participating LSR before sending it to the CPM. It also forwards the processed message unit downstream to the next node, which can be a next-hop node or a terminating (egress) node. When the egress node receives the message unit, it forwards a copy of the message unit to the CPM. In the CPM, the information field or fields selected for tamper detection are compared and a notification is sent if the pair of values for a monitored information field is not an expected pair. A notification can also be send if a message unit contains information fields that deviate from established network policies as defined in the network policy database. The next-hop or terminating node processes the message unit. If it is a terminating node, the node processes the terminating PATH message unit and then launches a RESV message unit that corresponds to the PATH message unit upstream to the ingress node that originated the initial PATH message unit. This RESV message unit is transmitted to the ingress node in the reverse order of transit nodes compared to the nodal order through which the PATH message unit was transmitted. As the RESV message unit is passed back through the nodal pathway, each node sends a copy of this RESV message unit to the CPM for security analysis by comparing the sequential values of one or more information fields. The CPM receives each one of the subsequent messages units and, as with the PATH message unit processing, it executes a comparison algorithm to determines whether any of the message information fields have been changed in an unauthorized fashion. If field tampering is detected, notification occurs. Two among many possible methods of notification are logging to a file and displaying on a monitor. Other methods include but are not restricted to visual notification and audio notification.

A demonstration of an embodiment of the method of this invention employed a node model that was constructed using a network communications simulator. The modeling software used to provide the simulation was OPNET Modeler release 8.0.c and is copyright protected by OPNET Technologies, Inc.

In this demonstration, the node is represented by a collection of interconnected modules in which data is manipulated as defined by the modules themselves. Modules represent the internal capabilities of a node such as data creation, transmission, processing, internal routing, reception, storage and queuing. Within the OPNET Node editor, a variety of different modules can be accessed. The modules are used to model some aspect of node behavior. A single node model is usually comprised of multiple modules. The modules are connected together by packet streams and statistic wires. Packet streams are used to transport data between the modules while statistic wires allow one module to monitor a varying quantity within another module. The ability to integrate the use of modules, packet streams, and statistic wires allows the creation of highly realistic simulations of node behavior.

Modifications to the RSVP signaling control plane software that were used to implement this invention in the demonstration embodiment are in reference to the RSVP process model. In addition, modifications used to implement this invention were incorporated within the IP packet processing block. Modifications within the IP packet processing block allow RSVP packets that originating from each router node interface to be routed to the CPM for processing. RSVP packets originating from the RSVP process module are identified by a "type' field located within the packet itself. This type identification triggers the IP packet processing block to disregard a standard IP routing table lookup for information pertaining to the routing of the RSVP packet. Because RSVP packets utilize a field that is populated by the IP addresses of each RSVP participation node, route lookup is not needed to forward the packet to the next-hop node. Because a copy of this packet is sent to the CPM, it uses the standard route "lookup" process to allow the packet to reach its destination (the CPM). To accomplish this function in the demonstration of this invention using the OPNET simulator, a new type identifier is created and inserted within the RSVP packets that are intended to be sent to the CPM. This allowed the IP packet processing block to discriminate between the RSVP standard forwarding packet and the RSVP route lookup packet destined for the CPM.

To implement the demonstration of this invention using the OPNET simulator, several parts, called state blocks, within the RSVP process module are modified. These include the Path, Send_Label, Resv, and Send_LRO state blocks. In addition, two new state blocks are added: a CPM block and a CPM tear block. Code modified in accordance with the method of this invention is incorporated in the nodes that are used in the demonstration to simulate a physical network. For example, the nodes that are used comprise routers (LSRs and LERs), workstations, and servers.

In this demonstration of the invention using the OPNET simulator, several state blocks were used. Their functions are described below. Other simulators than OPNET and physical networks with components that perform similar functions are also suitable for implementation of the method of this invention.

For the demonstration of this invention, several modules of the simulator were modified to incorporate procedures for transmitting message units to the CPM. Following is a description of the implementation of the invention using the simulator.

The Send_LRO module is responsible for the initiation of a signaling request. This request is initiated from the Ingress router and launches the PATH setup message for a Label Switch Path (LSP).

The Send LRO state is entered when the corresponding Node is an Ingress LER for at least one LSP. In this state, set up all the LSPs originating from this node:

1) Find all the LSPs originating from this node.
2) For all LSPs get the constraints and Explicit route.
3) Create the PATH message with LABEL_REQUEST object.
4) Create a corresponding Path state.
5) Invoke route query to find the list of outgoing interfaces for the path message, and copy them into the path state.
6) Execute Path refresh sequence. This sequence sends path messages to all outgoing interfaces defined in step 2.

This PATH message is sent node-to-node from the Ingress to the Egress of the network. This PATH message contains the following fields of information referred to as objects, that pertain to the setup of the LSP.

Label Request Object—request a label binding, along with label type and label range be associated with the LSP.

Explicit Route Object—predefines an explicit hop-by-hop route from the Ingress router through the network to the Egress router, independent of standard IP routing protocols.

Record Route Object—this field is populated by each router that is participating in the LSP setup. The IP address of each subsequent node is recorded on its way to the Egress router.

Session Attribute Object—defines the session type of the LSP Ipv4 or IP v6, and preemption capability of the specified LSP.

CoS Flowspec Object—defines specific attributes of the requested data flow such as inter-packet delay and minimum bandwidth the LSP needs to provide.

These are examples of some of many types of object fields that the CPM can examine during LSP set-up to detect tampering or other failure to properly establish the LSP. Each link associated with the setup of the LSP reports to the CPM the path information that it processes and forwards to downstream routers. Each link also reports to the CPM all reservation message information, for example, the RESV messages, that it receives from participating routers.

In addition to protecting the integrity of the PATH setup message by detecting tampering or other unauthorized alterations, this invention provides similar protection for the subsequent RSVP "RESV" signaling messages. The RESV message contains the following data objects that are associated with the setup of a LSP.

Label Object—Performs the upstream on demand label distribution process.

Record Route Object—Returns the LSPs path to the sender of the PATH message, also use to find hop-by-hop route back to the Ingress node.

Session Object—Uniquely identifies the LSP being established.

Style Object—Specifies the reservation style and filter type of the LSP.

The RESV function is associated within the Resv and Send_Label process blocks. This corresponds to the reservation message unit of this invention.

These are examples of some additional types of object fields or information fields that the CPM can examine during LSP set-up to detect tampering or other failure to properly establish the LSP. Each link associated with the reservation confirmation of the LSP reports to the CPM the reservation information that it processes and forwards to upstream or downstream nodes, such as routers in this demonstration embodiment.

The overall security approach of this invention utilizes a link-by-link analysis of signaling information. It starts with the first path message unit generated from the ingress node and ends when the ingress node receives the final reservation message unit. Any message objects or fields that are deleted, changed, manipulated, or otherwise caused to deviate from expected values or allowed network policies are detected and reported at the CPM.

The method of the invention is built around temporarily storing LSP path and reservation object information that has been sent by each link of the MPLS participating nodes. It starts the analyses by first determining the LSP message type, for example, either PATH or RESV in the RSVP-TE protocol. This allows the code that executes the method of this invention to direct packets to the appropriate section of the comparator for processing.

In one embodiment of the invention, for example, for PATH message processing, the node (router) ID and the LSP object ID used for status reporting are stored. The CoS flowspec object, which contains the QoS bandwidth variable and the QoS time delay variable, is stored. Also stored is the explicit route object, which contains directed path information for the LSP. As each subsequent node link reports its LSP signaling path information, the CPM compares the information shared between any two interconnected node links to determine if the information that was sent and the information that was received form an appropriate pair of values. Information that has been subjected to tampering by a man-in-the-middle agent is quickly detected and the system administrator can be notified.

In one embodiment of the invention, for example, for RESV message processing, the router ID and the LSP object ID are stored. This can be used for status reporting. It can also be used to correlate PATH and RESV messages that belong to the same LSP. The label that has been assigned by the downstream node and reported by the subsequent upstream node is stored.

A physical embodiment of the invention was demonstrated using a physical network consisting of an ingress router, an egress router, three label-switched routers, and a monitor computer that comprised the CPM. A MPLS Linux kernel code that supported DiffServ and RSVP-TE was used for the demonstration network. The daemon employed has DiffServ over MPLS support, the use of multiple routing tables and LSP byte and packet counters. The daemon also supports LSP rerouting and LSP protection switching. Netfilter is the part of the Linux Kernel that is used to classify the outgoing packets, the quality of service, and queuing for differentiating between flows. The RSVP daemon is responsible for the RSVP signaling, maintenance of the MPLS states, allocation/installation of the MPLS labels during LSP setup, and freeing and removing labels on LSP tear down.

For the demonstration of this invention on a physical network, the daemon was compiled and run on six PCs running Red Hat Linux 7.1, kernel version 2.4. Details are in the U.S. provisional patent application Ser. No. 60/605,644, incorporated herein by reference.

DiffServ is a type of traffic control architecture for providing different types of service (ToS) for network traffic, which provides a Layer 3 Quality of Service (QoS) solution. A router at the edge of the network identifies packets based on the IP precedence or on the DiffServ Code Point (DSCP) fields in the header. Network devices that support DiffServ use DSCP code points in the IP header to select a per-hop behavior (PHB) for a packet. In the case of the daemon employed in the demonstration of this invention, the type of service is based on the value located in the EXP field in the MPLS header (Service Type).

The ToS field describes one entire byte (eight bits) of an IP packet. The six most significant bits of the ToS byte are called the DiffServ field. The last two bits in the DiffServ field are used as Early Congestion Notification (ECN) bits. IP precedence uses three bits, while DSCP, an extension of IP precedence, uses six bits to select the PHB (per-hop behavior) for the packet at each network node. For example, if a packet is marked with a DSCP value of 000000, the PHB determines traditional "best effort" service from a DS-compliant node. If a packet arrives at a DS-compliant node and its DSCP value is not mapped to a PHB, it will get mapped to the default "best effort" PHB.

There are specific definitions for the DSCP values that define the per-hop behavior for a packet. Expedited Forwarding (EF) PHB provides for a guaranteed bandwidth service, while Assured Forwarding (AFxy) PHB defines a method by which behavior aggregates can be given different forwarding assurances. The EF PHB (DSCP value of 101110) provides for a low-loss, low-latency, low-jitter, and assured bandwidth service, ideal for applications such as video streaming and Voice over IP.

The Assured Forwarding (AFxy) PHB defines four AFx classes, AF1, AF2, AF3, and AF4. Each class is assigned a certain amount of buffer space and bandwidth, dependent on the service level agreement (SLA) with the Service Provider. Within each AFx class there are three different drop precedence values. Therefore, if there is congestion at a node on a specific link, and packets of a particular AFx class need to be dropped, packets in AFxy will be dropped such that AFx1<=AFx2<=AFx3.

The daemon modified for the demonstration of this invention uses DSCP to assign quality of service attributes, which are then mapped to the EXP field in the MPLS header, and then assigned to an LSP. Since the EXP field is only three bits long, the daemon has a translation from DSCP to DiffServ/MPLS. What this means is that the Layer 3 QoS has been translated to Layer 2. DS/MPLS can then only support eight different types of service for an LSP, with one type of service dedicated to an explicitly routed LSP (E-LSP). The other seven are shortest path LSPs (L-LSP) that are set up in the network according to IP routing tables, and the DSCP signaling is encoded during LSP setup. Traffic can be mapped on the LSPs based on the destination address, protocol, destination port, and port ranges of the IP packets.

The physical network employed for the demonstration of an embodiment of this invention comprised two workstations, two MPLS edge routers (ingress node and egress node), three MPLS core routers (LSR1, LSR2, and LSR3, and the CPM.) The two workstations are configured to communicate with each other across the network through the MPLS routers. The edge routers are the locations where the LSPs are set up and torn down, while the core routers (transit nodes) offer two different routes through which the LSPs may be directed.

A logging program, which resides on each of the MPLS routers, uses PCAP to sniff incoming/outgoing packets (message units) on each of the interfaces and then sends a copy of the packet (message unit) to a specific port on the CPM for processing. During logging, RSVP packets (message units) are sniffed and sent to the CPM. There are two different types of RSVP messages, PATH and RESV, so in the case of an LSP being setup across LER1→LSR1 →LSR2→LER2 there would be six packets for each type of RSVP message being sent to the monitor, for a total of twelve packets in the LSP that is setup. If an LSP were setup from LER1 to LER 2 by passing through LSR1, LSR3, and LSR2, there would be 16 total RSVP packets sent to the CPM When packets are logged on the MPLS routers and sent to the CPM, the CPM monitors specific ports upon which the incoming packets (message units) are expected to be arriving. The packets are put in order in the sequence for an LSP that is being setup across the routers. It is the CPM that processes the packets to detect whether the control-plane setup for an LSP has been compromised. The CPM can also monitor LSP refresh messages that maintain the LSP.

In this embodiment of the invention, the CPM monitors eleven specific open ports (eleven ports for the different interfaces on the MPLS routers) for incoming packets from the routers. It then uses PCAP functions to read the packet information and compare the packets. The first comparison checks to make sure that what one router has sent to another is what the other has received. For example, if LER1 sent a packet to LSR1, the CPM would receive a packet from LER1 that was sent to LSR1 and would also receive a packet from LSR1 that was received from LER1. The CPM would compare the two packets to make sure part of the message unit that was being compared was identical (checking for "man-in-the-middle" attacks). This comparison process occurs for every link on an LSP so, for the LSP example described herein, there would be 6 comparisons for the twelve packets sent to the monitor for the LSP.

The CPM can provide the system administrator with notification of an unauthorized change in a packet in a variety of ways. Some ways include but are not restricted to logging to a file, providing a graphical display on a monitor, providing a text display, providing a visual indication such as, for example, a flashing light, providing an audio notification, and other ways that will be readily apparent to a practitioner of this invention.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method practiced on a computer for monitoring a path through a computer network comprising:
    generating a first message unit, the first message unit including a path identifier and at least one information field;
    generating a second message unit within a node along the path through the computer network, the second message unit comprising the path identifier, and a path summary comprising the at least one information field; and
    generating a notification, responsive to determining whether the first message unit and the second message unit produce an expected pair of values of the at least one information field.

2. The method of claim 1, further comprising determining by a comparator whether the first message unit and the second message unit produce the expected pair of values of the at least one information field.

3. The method of claim 1, wherein the node along the path through the computer network wherein the step of generating the second message unit is carried out is a node within which the first message unit was generated or a next-hop node.

4. The method of claim 1, wherein the first message unit further comprises an identifier of a next-hop node of the computer network.

5. The method of claim 1, wherein the second message unit further comprises an identifier of a next-hop node of the computer network and a path summary.

6. A method practiced on a computer for monitoring a path through a computer network comprising:
    generating a first message unit, the first message unit including a path identifier and at least one information field;
    generating a second message unit within a node along the path through the computer network, the second message unit comprising the path identifier, and a path summary comprising the at least one information field; and
    generating a notification, responsive to determining whether the first message unit and the second message unit produce an expected pair of values of the at least one information field, wherein the path through the computer network comprises a label-switched path.

7. The method of claim 6, wherein the first message unit comprises a first path message and the second message unit comprises a second path message.

8. The method of claim 7, wherein the at least one information field includes one of a label-switched path ID field, a label request object, an explicit route object, a record route object, a sender template object, a session attribute object, a filter spec object, a flow spec object, and a class-of-service object.

9. The method of claim 6, wherein the first message unit comprises a first reservation message and the second message unit comprises a second reservation message.

10. The method of claim 9, wherein the at least one information field includes one of a label-switched path ID object, a label object, a record route object, a session object, and a style object.

11. A method practiced on a computer for monitoring a path through a computer network comprising:
    detecting a generation of a tear-down message unit by a network node;
    determining whether the network node is an authorized node to generate the tear-down message unit; and
    generating a notification if the network node is not the authorized node.

12. The method of claim 11, wherein the tear-down message unit comprises a path tear-down message
    and the step of determining comprises determining whether the path tear-down message corresponds to a path tear-down message generated by the authorized node.

13. The method of claim 12, wherein the path tear-down message comprises a label-switched path session ID field object and a sender template object and the step of determining comprises determining whether the label-switched path session ID field object and the sender template object of the path tear-down message correspond to a label-switched path session ID field object and a sender template object of the path tear-down message generated by the authorized node.

14. The method of claim 11, wherein the tear-down message unit comprises a reservation tear-down message and the step of determining comprises determining whether the reservation tear-down message corresponds to a reservation tear-down message generated by the authorized node.

15. The method of claim 14, wherein the reservation tear-down message comprises a label-switched reservation session ID field object and a next-hop object and the step of determining comprises determining whether the label-switched reservation session ID field object and the next-hop object of the tear-down message correspond to label-switched path reservation session ID field object and a next-hop object of the reservation tear-down message generated by the authorized node.

16. A method practiced on a computer for monitoring a path through a computer network comprising:
   generating a message unit comprising a path identifier and a path summary comprising at least one information field;
   determining by a comparator whether the message unit complies with an allowed policy in a network policy database; and
   generating a notification if the message unit fails to comply with the allowed policy in the network policy database.

17. The method of claim 16, wherein the network policy database defines an allowable condition including one of a path route and a class of service request.

* * * * *